United States Patent
Gates et al.

(10) Patent No.: US 12,248,974 B1
(45) Date of Patent: Mar. 11, 2025

(54) SYSTEM AND METHOD FOR RECOMMENDING RESALE ALTERNATIVES FOR RETAIL ITEMS

(71) Applicant: Phia Holdings Inc., Menlo Park, CA (US)

(72) Inventors: Phoebe Gates, New York, NY (US); Sophia Kianni, New York, NY (US); Silas Alberti, Stanford, CA (US)

(73) Assignee: Phia Holdings Inc., New York, NY (US)

( * ) Notice: Subject to any disclaimer, the term of this patent is extended or adjusted under 35 U.S.C. 154(b) by 0 days.

(21) Appl. No.: 18/429,245

(22) Filed: Jan. 31, 2024

(51) Int. Cl.
- G06Q 30/00 (2023.01)
- G06F 40/20 (2020.01)
- G06Q 30/0601 (2023.01)
- G06V 20/50 (2022.01)

(52) U.S. Cl.
CPC ......... G06Q 30/0631 (2013.01); G06F 40/20 (2020.01); G06V 20/50 (2022.01); *G06V 2201/10* (2022.01)

(58) Field of Classification Search
CPC .................................................. G06Q 30/00
See application file for complete search history.

(56) References Cited

U.S. PATENT DOCUMENTS

| | | | |
|---|---|---|---|
| 9,817,900 B2 | 11/2017 | Yan et al. | |
| 10,102,448 B2 * | 10/2018 | Hill | G06F 16/24578 |
| 10,846,327 B2 | 11/2020 | Salokhe et al. | |
| 11,727,463 B2 | 8/2023 | Sollami et al. | |
| 11,763,360 B1 * | 9/2023 | O'Connor | G06Q 30/06 705/26.1 |
| 11,804,210 B2 * | 10/2023 | Miller | G06Q 30/0601 |
| 2013/0339191 A1 | 12/2013 | Shanfeld et al. | |
| 2014/0344102 A1 * | 11/2014 | Cooper | G06Q 30/0631 705/26.7 |
| 2015/0006325 A1 | 1/2015 | Zhao | |
| 2015/0046281 A1 * | 2/2015 | Shivaswamy | G06Q 30/0631 705/26.7 |
| 2015/0066684 A1 | 3/2015 | K. V et al. | |
| 2018/0276727 A1 * | 9/2018 | Patel | G06Q 30/0603 |
| 2019/0244407 A1 * | 8/2019 | Wiesel | G06T 11/00 |
| 2020/0226656 A1 * | 7/2020 | Hadden | G06V 20/52 |
| 2020/0311798 A1 | 10/2020 | Forsyth et al. | |

(Continued)

OTHER PUBLICATIONS

Ueland, Sig, "20 recommerce, brands, marketplaces, Platforms", Practical Ecommerce, dated May 22, 2023. (Year: 2323).*

(Continued)

*Primary Examiner* — Mark A Fadok
(74) *Attorney, Agent, or Firm* — Bold IP PLLC; Houda El-Jarrah; Christopher Mayle (57) ABSTRACT

A system and method for an integrated subsystem that identifies resale consumer goods available for sale whereby picture or text descriptions of items of firsthand consumer goods may be used as an input or search query where a user may enter size, style, and color parameters for clothing and fashion items. The plug-in uses a web crawler to maintain a database of resale consumer goods for sale and may isolate a single clothing item from a clothed person to perform a search query for resale versions of that item as well as provided improved specifically tailored results based on what the user is looking for at that specific time.

17 Claims, 7 Drawing Sheets

(56) References Cited

U.S. PATENT DOCUMENTS

| | | |
|---|---|---|
| 2021/0398183 A1 | 12/2021 | Jain et al. |
| 2022/0012783 A1 | 1/2022 | LaFlamme |
| 2022/0076318 A1 | 3/2022 | Sazan |
| 2022/0405706 A1 | 12/2022 | Puthenveetil et al. |
| 2023/0016483 A1 | 1/2023 | Arnaout et al. |
| 2023/0031983 A1 | 2/2023 | Hemminger et al. |

OTHER PUBLICATIONS

Xi, Yunjia, "Multi-level interaction reranking with user behaviour history", arxiv.org, dated: Apr. 20, 2022. (Year: 2022).*

Find Anything Secondhand. Get the brands you love for less. https://www.joinbeni.com/ [Date accessed: Oct. 3, 2023].

* cited by examiner

SYSTEM AND METHOD FOR RECOMMENDING RESALE ALTERNATIVES FOR RETAIL ITEMS

FIELD OF DISCLOSURE

The overall field of this invention is directed to a recommendation system that automatically suggests resale alternatives for any item while a user is shopping online using reverse image/text search and ranking algorithms to provide the users with the best resale alternatives for any items depending on their current situation.

BACKGROUND

Online shopping is the process of buying goods or services directly from a seller over the internet using a web browser or a mobile application. It's a digital evolution of traditional shopping, enabling consumers to shop from the comfort of their homes or on the go, without having to physically visit a store. While online shopping offers a plethora of benefits, it is also associated with several challenges. It's hard to shop sustainably, the cost of goods in combination with shipping and taxes can be expensive, and you can't find resale products. Standard reverse image search and semantic searching currently used resale marketplaces do not allow for adequate results especially for fashion items and accessories that are constantly being updated and can be time and memory consuming. Thus exists the need for an improved search engine that utilizes one or more algorithms that takes all the data from resale partners and uses artificial intelligence to unify the data, to return the best results in a more streamlined fashion.

SUMMARY

It is an object of the present invention to extract information from a first-hand fashion website that a user is visiting and find secondhand goods, used goods, recommerce goods, overstock items, or deadstock items given that information. The core novelty of this invention is the improvement to existing search algorithms and how the data is allocated. The search consists of five steps. The first step is First-Hand Website Extraction whereby when on a first-hand fashion website, the system extracts relevant product metadata for the search, e.g., title, image, brand, price. The extraction step may be broken down into the following four approaches: metadata heuristics, Large Language Model (LLM) based extraction, manual selector-database, and an LLM-generated selector-database.

The second step is data preparation. This step includes classification into product categories using LLM-based classification and intelligent image cropping for when the product image shows multiple products (e.g., a model wearing both pants and a shirt). Using the product category and the image, the system may crop the product image onto the correct item using a combination of two foundation models. When multiple images are present, the system determines which image represents the product best, using size & website heuristics. The system may perform foundation model-based classification and intelligent color detection which may automatically find the closest color word describing a fashion piece using a combination of segmentation foundation models, clustering algorithm, and color space mapping.

The third step includes embeddings. In order to perform a semantic search, the system generates vector embeddings using a Contrastive Language-Image Pre-training (CLIP) model for images and a sentence transformer for text that has been fine tuned for retail items such as home goods, electronics, or fashion. The fine tuning may come in various forms such as CLIP multi-modal fine-tuning, caption generation from product metadata, and first-hand/second-hand vector alignment.

The fourth step includes ranking. During this step the system retrieves the closest vector from the search index for both the image and text vectors. Here the system uses a vector database and any number of Approximate Nearest Neighbor (ANN) algorithms including but not limited to a Hierarchical Navigable Small Worlds (HNSW) algorithm or Inverted File System (IVF) algorithm for computing a suitable similarity metric, e.g., dot product or cosine similarity. The system then applies a set of filters based on our extracted metadata (category, size, price, brand). This search is performed in parallel using multiple product images, text vectors, and multiple filter sets to retrieve multiple result sets which are fused in the next step.

The fifth step includes fusion and re-ranking. After performing multiple ranking queries and obtaining multiple sets of scored results, the system merges them into a final result list. This is done using a combination of classic rank-fusion algorithms, filtering heuristics, and LLM-based preference-aware reranking.

It is another object of the present invention to provide a data pipeline initially for the resale of consumer goods including four steps. Resale consumer goods may refer to secondhand goods, used goods, recommerce goods, overstock items, deadstock items, or any alternative method of purchase. Overstock goods refers to unsold consumer goods that accumulate in retail operations, including both shelf and warehouse items. These products have never been purchased by consumers and are considered excess inventory. To manage overstock, retailers may adopt several strategies: returning items to the manufacturer or distributor, selling them to wholesalers or retailers who specialize in secondary markets, offering deep discounts to current customers, or disposing of them through salvage companies that extract valuable metals and components. Off-price retail outlets purchase excess or unpurchased items, including unsold collection pieces from showrooms, directly from brands or their retail and distribution channels. They operate under specific agreements to acquire these goods so they can sell them to end customers at the smallest possible profit margin The first step is loading, whereby the system loads and parses the resale inventory data from a variety of sources (SFTP (Secure File Transfer Protocol) servers, Application Programming Interface (APIs), storage buckets) and data formats (XML, JSON, CSV). Using a serverless cloud computing pipeline, the system parses them and brings them into a common schema.

The second step is unification & cleaning where the system applies a combination of heuristics and LLM-based approaches to clean the data and then bring the data into a common categorization scheme and fill in missing fields.

The third step is inventory management in which the system maintains a data warehouse that keeps track of the inventory changes every day. This is important since ingesting into the search index is very expensive. The system keeps track of which items are new and have to be added to the search index, which items have updated metadata and have to be edited in the search index, and which items are sold out and should be removed from the search index.

The final step is ingestion where the system downloads the images into vectors where they are then updated and inserted into the vector database.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification includes only some of the possible combinations of such particular features.

Where reference is made herein to a method comprising two or more defined steps, the defined steps may be carried out in any order or simultaneously (except where the context excludes that possibility), and the method can include one or more other steps which are carried out before any of the defined steps, between two of the defined steps, or after all the defined steps (except where the context excludes that possibility). In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

As used herein, "retail items" and "consumer goods" or "consumer items" refers generally to items such as clothing and accessories which may include but not limited to items such as dresses, suits, jeans, shirts, skirts, hats, belts, and scarves and footwear such as shoes, boots, and sandals. "Retail items" may include electronics which may include but are not limited to items such as smartphones, laptops, TVs, cameras, headphones, and various accessories for these devices. "Retail items" may include groceries which may include but are not limited to items such as food and beverage items, fresh produce, dairy products, meats, canned goods, snacks, beverages, and baking ingredients.

As used herein, "retail items" and "consumer goods" or "consumer items may include health and beauty products which may include but not limited to items such as cosmetics, skincare products, perfumes, hair care products, soaps, and over-the-counter medicines. "Retail items" may include home and garden supplies which may include but are not limited to items such as furniture, home decor, gardening tools, plants, kitchenware, and bedding items are part of this category. "Retail items" may include toys and games which may include but are not limited to items such as board games, video games, action figures, dolls, and educational toys.

As used herein, "retail items" and "consumer goods" or "consumer items" may include books and stationery which may include but not limited to items such as novels, textbooks, magazines, notebooks, pens, and other office supplies are included here. "Retail items" may include sports and outdoor equipment which may include but are not limited to items such as sports gear, camping equipment, bicycles, fitness equipment, and outdoor apparel are part of this category. "Retail items" may include watches and jewelry and may include but not limited to items such as necklaces, bracelets, earrings, rings, and a variety of watches.

As used herein, "retail items" and "consumer goods" or "consumer items may include automotive which may include but not limited to items such as car parts, accessories, tools, and maintenance items for vehicles fall under this category". Retail items" may include pet items which may include but are not limited to items such as food, toys, grooming tools, and health care products for pets are included here. "Retail items" may include music, movies, and video games which may include but are not limited to items such as CDs, vinyl records, DVDs, Blu-ray discs, and related accessories. "Retail items" may include craft and hobbies which may include but not limited to items such as Items for crafting, like yarn, fabric, paints, and tools for hobbies such as model building and scrapbooking.

In addition, "vendor," as used herein, refers generally to merchants, users, or other parties that offer consumer goods for sale online. Moreover, "seller" may further refer to merchants, vendors, other users, or other entities that have a relationship that have their consumer goods searched for sale and are searchable from recommendation application 110.

Figure 1:
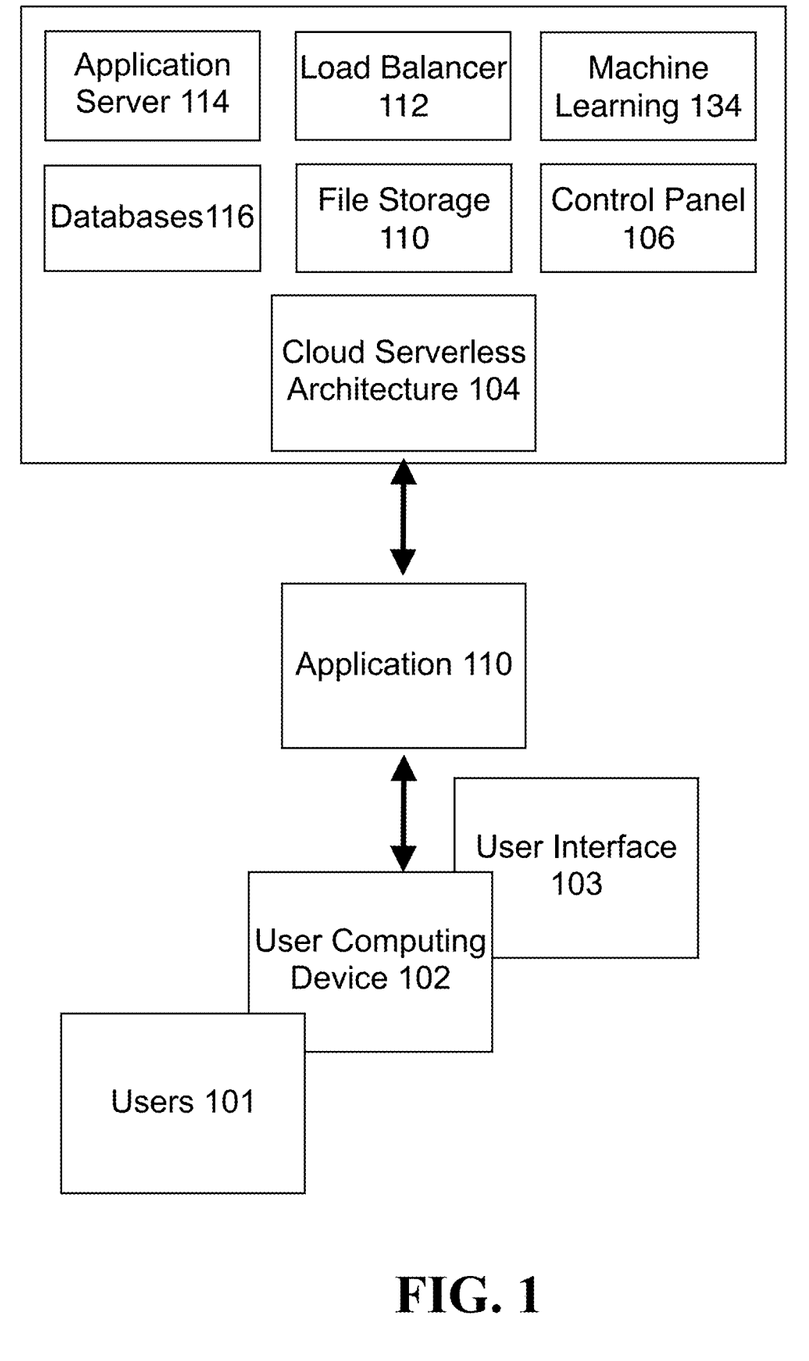
FIG. 1 shows a block diagram for the recommendation system.
Figure 2:
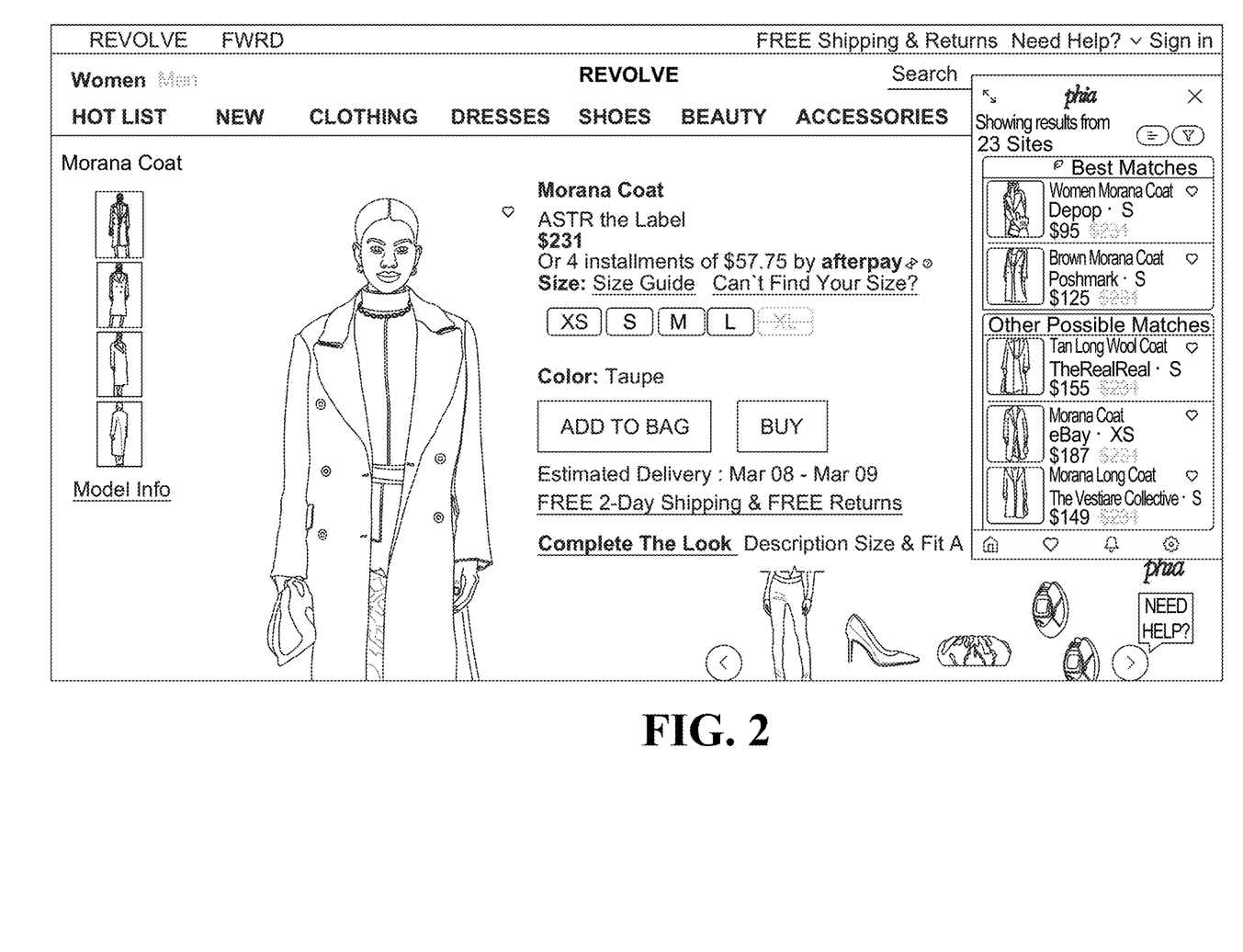
FIG. 2 shows a first screen on a user interface for the recommendation system.
Figure 3:
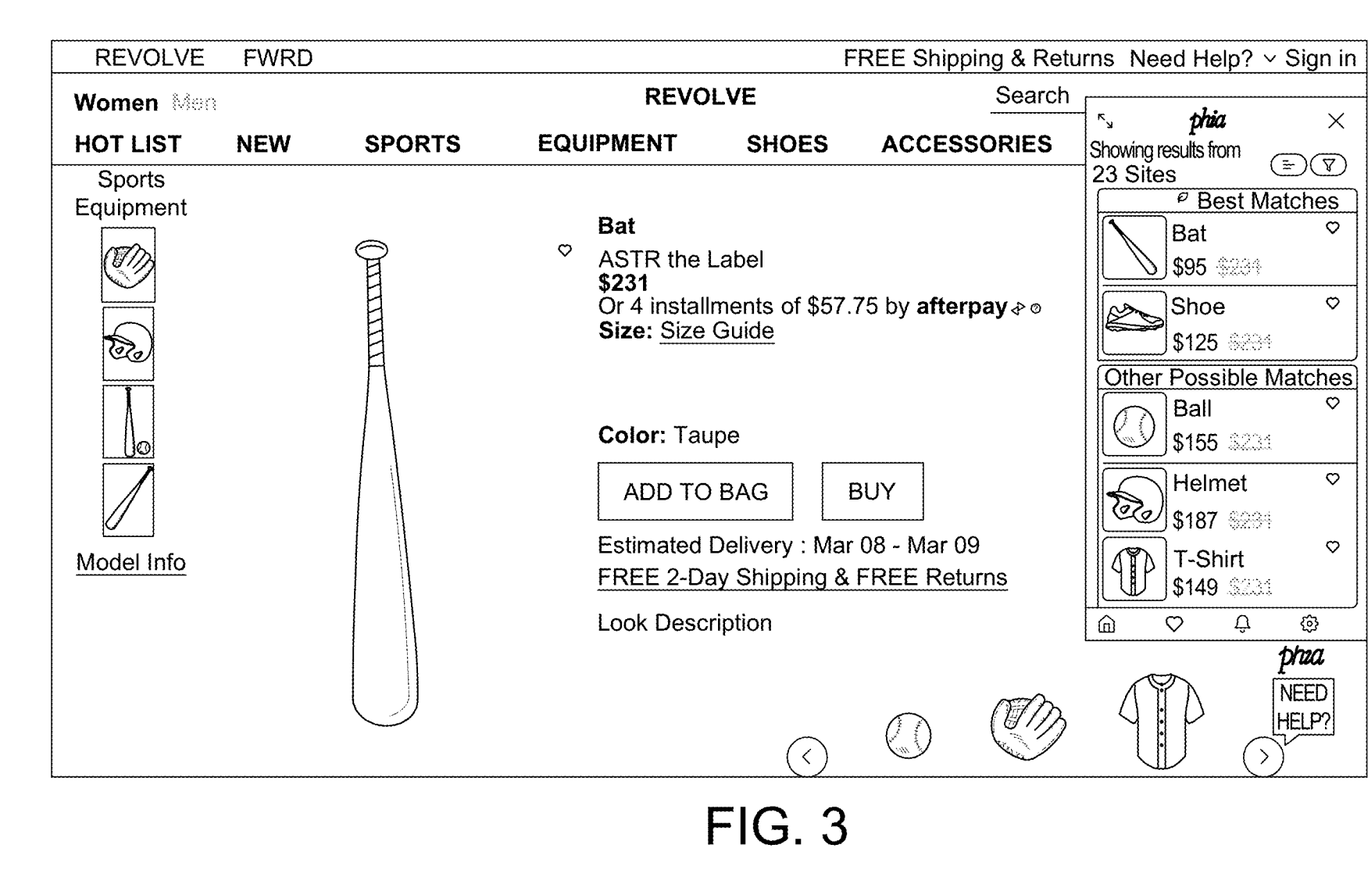
FIG. 3 shows another screen on the user interface for the recommendation system.
Figure 4:
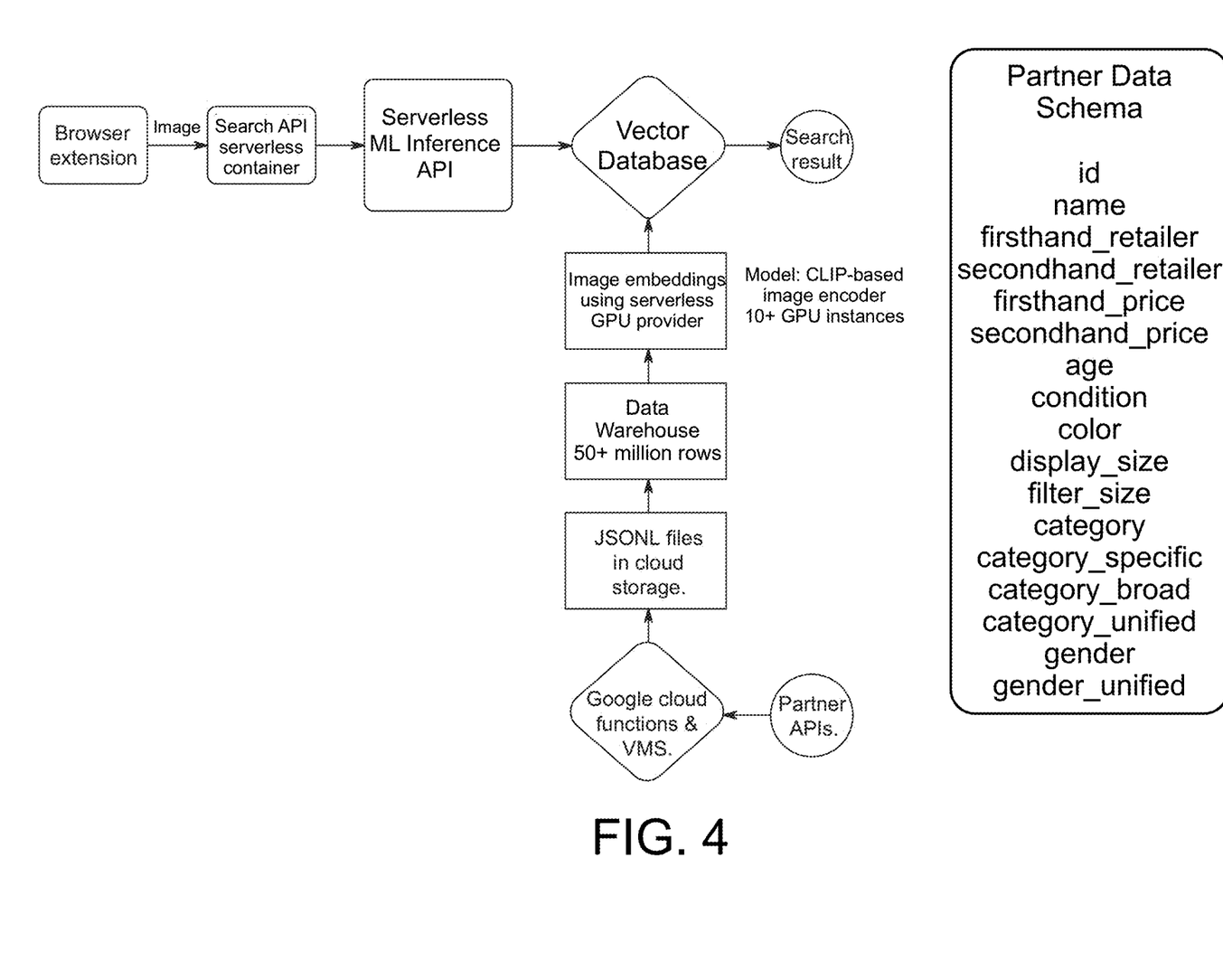
FIG. 4 illustrates a method for a recommendation system.
Figure 5:
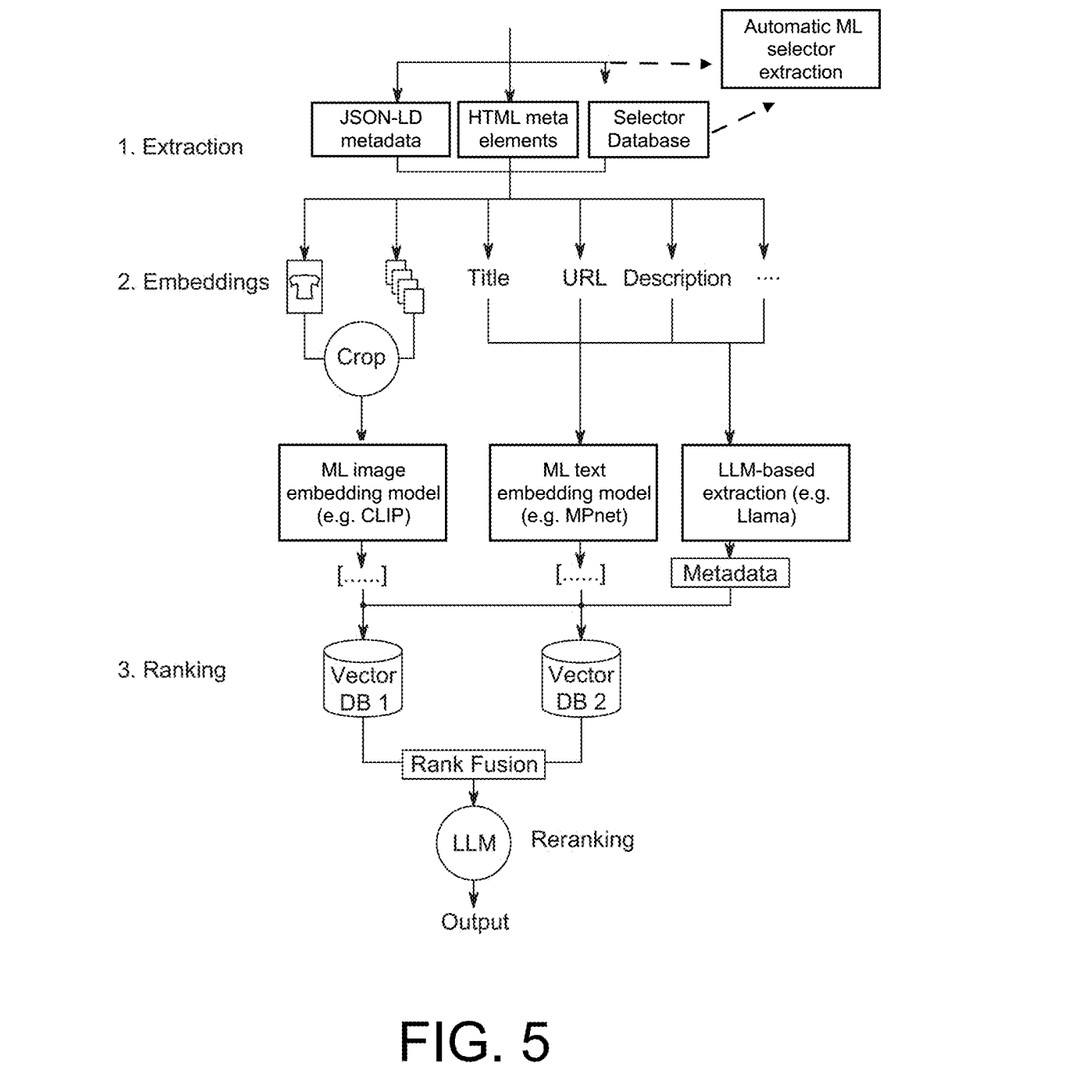
FIG. 5 illustrates another method for the recommendation system.
Figure 6:
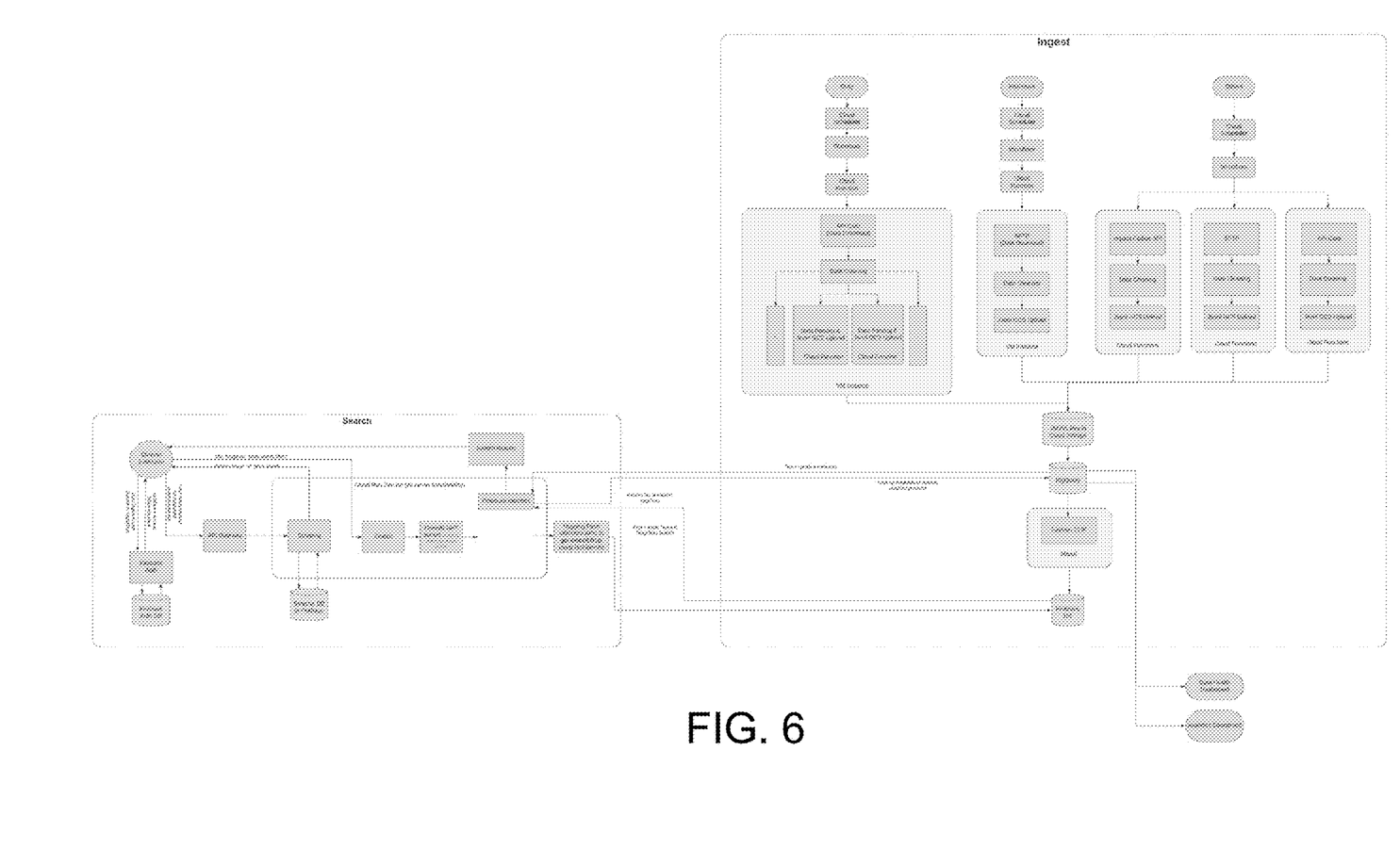
FIG. 6 illustrates a block diagram for the system flow of the recommendation system.

Turning to FIG. 1, FIG. 1 depicts a block diagram of an embodiment of the present invention for a recommendation system 100 that provides a computer browser extension which finds resale sellers of fashion items being viewed on a firsthand seller site or uploaded by a user. The system uses a web crawler to maintain a database of resale consumer items on partner websites or the entirety of the internet and then uses artificial intelligence algorithms to enhance matching results. In some embodiments, the system can isolate a single consumer item from a person's outfit by receiving a text prompt or with trained models. The plugin then searches its database for the same item available from a resale seller. Recommendation system 100 is illustrated as a simplified block architecture diagram consistent with the embodiments of the present disclosure.

A user 101 may be any type of user browsing the internet or other network. A user device 102 may be any device that includes a computer including, but not limited to, any non-transitory computer-readable medium such as a personal computer, a desktop computer, a laptop computer, a computer notebook, a computer tablet, a smartphone, or other computing device under the philosophy of the internet of things. In some embodiments, browsing the internet may be performed using a graphical user interface (GUI) 103 accessed from user device 102. User interface 103 may have a plurality of buttons or icons that are selectable by user 101 to perform particular processes in response to the selections. User interface 103 may have conventional GUI interface devices such as a title bar, text boxes, toolbars, pull-down menus, tabs, scroll bars, context help, dialog boxes, operating buttons (icons) and status bar that enable user navigation throughout the display.

Recommendation application 110 may be an application program or extension (Chrome, Firefox, Safari, Edge, Arc) that might be using frameworks like Next.js or Plasmo, respectively, and that is stored and delivered over the Internet through a browser interface as an extension or other method. User 101 may access recommendation system 100 by using a web browser to navigate to an application or URL associated with recommendation system 100.

Application server 114 acts as a host or container for business logic while facilitating access to and performance of the application. As illustrated, recommendation system 100 may include one or more servers capable of storing/and or processing information of resale consumer sites. The servers may be web servers, database servers, or any other server capable of processing and/or storing information. The servers may be located remotely, such as when coupled via a computer network or cloud-based network, including the Internet, and/or locally, including on an electronic device (e.g., computer, mobile phone, or any other portable or non-portable electronic device). The servers may include a virtual computer, dedicated physical computing device, shared physical computer or computers, or computer service daemon, for example.

Cloud serverless infrastructure 104 may be a collection of hardware and software elements needed to enable cloud computing and serverless architecture. Cloud serverless infrastructure 104 can include computing power, networking, storage, and interface for user access. A virtual private cloud is an on-demand configurable pool of shared computing resources allocated within a public cloud environment, providing a certain level of isolation between the different organizations and users. Cloud serverless infrastructure 104 may auto-scale based on demand, and focus on event-driven, fine-grained functions. Cloud serverless infrastructure 104 allows recommendation system 100 to build and deploy processes with reduced operational overhead and efficiency.

Application server 114 and cloud serverless infrastructure 104 may be connected to a database 116 that represents a series of data that is managed by a database management system, also called electronic database, and are structured to facilitate the storage, retrieval, modification, and deletion of data in conjunction with various data-processing operations. Database 116 is an organized collection of data, generally stored and accessed electronically from a computer system. Database 116 may physically or logically be divided into one or more separate databases. Database 116 may include user account information with the recommendation application 110, saved searches and/or lists of potential matches, unsuccessful search requests, logs of suitable matches, stored images (e.g., stored subject images and/or sellers images of items offered for sale associated with particular sellers).

In some embodiments, database 116 may be integrated into application server 114. For example, application server 114 may include one or more hard disk drives. In other embodiments, database 116 is external to application server 114 and may be accessed by application server 114. For example, database 116 may include multiple storage units such as configuration. Database 116 may include a storage area network (SAN) and/or a network attached storage (NAS) system.

Application server 114 and cloud serverless infrastructure 104 may include a processor for executing instructions. Instructions may be stored in databases 116, for example.

The processor may include one or more processing units (e.g., in a multi-core configuration). Processor 124 is operatively coupled to a communication interface such that application server 114 or cloud serverless infrastructure 104 is capable of communicating with a remote device such as user device 102, the internet or other networks, or other servers. For example, the communication interface may receive requests from user device 102 via the Internet, as illustrated in FIG. 1.

Application server 114 may include a front-end web server that is coupled to user device 102 and other devices via a network such as Internet. Application server 114 may include a front-end web server to provide services to user 101. Application server 114 may include a back-end web server that is coupled to a user device via the Internet. The back-end web server may be on the same network or the same machine as a database server. The database server may process and/or store user and/or asset information.

Application server 114 and cloud serverless infrastructure 104 may be configured to communicate with user device 102 associated with a user 101. User device 102 is configured to execute and display a recommendation application 110, which enables communication between user 101 and application server 114, including transmitting search requests to and receiving potential matches from application server 114.

Control panel 106 represents a backend monitoring and management dashboard of the application and users in the database. Control panel 106 may be used internally to troubleshoot support issues File storage 108 represents a method for storing data in the cloud that provides servers and applications access to data through a shared file system.

Load balancer 112 sits between user devices 102 and backend servers to improve application availability and responsiveness and prevent server overload. Elastic load balancing automatically distributes incoming application traffic across multiple targets, containers, and IP addresses.

Processor machine learning system 134 may include a series of algorithms and training models consistent with the embodiments of this disclosure include supervised classification steps and procedures which uses rules and assumptions that the inputs are independent. After applying a sequence of defined instructions, the model processor learns based on past experiences and performs a computation that is useful in making a prediction. As the database of information and data sets increase, the corresponding prediction value increases. Further information about processor machine learning system 134 will be discussed later.

During initialization and continuously cloud serverless infrastructure 104 may be integrated directly into resale websites to search inventory. Cloud serverless infrastructure 104 may retrieve the link and the item characteristics associated with each accessed seller image before analysis of the corresponding image uploaded or found by the user. Cloud serverless infrastructure 104 may crawl an entire website, a subset of pages, or even search engines and image-sharing platforms. The parsing may include but not limited to HyperText Markup Language (HTML) parsing, text extraction, link analysis. Some web pages may include structured data in formats like JSON, XML, or CSV or microdata. This data can be parsed and used to extract product details, reviews, or other information.

In one non-limiting embodiment, cloud serverless infrastructure 104 may start by using a list of initial URLs (seed URLs) as starting point. Cloud serverless infrastructure 104 may send HTTP requests to these URLs to download web pages. Cloud serverless infrastructure 104 may then use the HTML content of the web pages to extract links to other pages and images. Cloud serverless infrastructure 104 may then follow the links to other pages and repeat the process. For each web page, application server 114 may then identify and collect image URLs and other relevant data.

Heuristics and Large Language Models (LLMs) may be used to clean up data by automating the process of identifying and rectifying errors, inconsistencies, and other issues in datasets. Heuristics may be used to define rules and checks for data validation whereby data from resale websites may be stored in a specific format. Heuristics may also verify that the data types of values in the dataset match the expected data types whereby the process may be repeated or data eliminated if it deviates too far from the expected types.

LLMs may be used to correct spelling and grammatical errors in textual data as well as corrections for typos, missing words, or incorrect grammar. LLMs may identify and standardize consumer entities such as names of people, brands and companies, types of outfits and brands. LLMs may be used to predict and impute missing values or fields based on patterns and relationships within the dataset such as a missing consumer brand or dimensions based on historical data. Heuristics and LLMs may identify and remove duplicate entries of consumer items from resale websites whereby they may compare records based on specific attributes and determine if two records are identical or there is some deviation such as a person selling a dress for eighty dollars on a first consumer site while selling the same dress for eighty dollars on a second consumer goods website. During this operation LLMs may utilize a caching process whereby frequently accessed data such as specific websites or sells may be stored in easily accessible locations such as a cache or database, in order to reduce the time and resources required to fetch the data from a slower, primary storage location.

Resale websites may be kept tracked and monitored for changes every day which is important since ingesting into the search index is very expensive. Cloud serverless infrastructure 104 may include inventory management in which the system maintains a data warehouse that keeps track of the inventory changes every day or over a different time period such as but not limited to an hour, week, or month. This is important since ingesting into the search index is very expensive. Cloud serverless infrastructure 104 may monitor and indicate which items are new and have to be added to the search index, which items have updated metadata and have to be edited in the search index, and which items are sold out and should be removed from the search index. During crawling, application server 114 may implement strategies to manage large-scale crawling, including rate limiting to avoid overloading websites, handling different types of pagination, and handling duplicate content.

Cloud serverless infrastructure 104 may natively have Optical Character Recognition (OCR) technology (one or more of the computer vision technologies) that may detect and recognize one or more types of objects from the content received and may use any technology currently implemented or known by those of ordinary skill in the art. For example, in some embodiments OCR is a task in computer vision that involves identifying the presence, location, and type of one or more objects in the given image.

In some embodiments, cloud serverless infrastructure 104 may analyze the image metadata (e.g., alt text, title attributes) then utilizing image recognition algorithms or APIs (e.g., Google Cloud Vision, Amazon Recognition). Cloud serverless infrastructure 104 may also apply pattern matching or regular expressions to detect image URLs. Cloud serverless infrastructure 104 may then store the results by saving the image URLs, along with any relevant metadata or contextual information, in a structured format such as a database, CSV file, or JSON file.

Once stored the images may then be converted into numerical vectors that can be used for various machine learning and computer vision tasks. Images may be resized to a consistent resolution to have consistent dimensions. Pixel values may be scaled to a common range (e.g., [0, 1] or [−1, 1]) to have similar intensity characteristics. During the process of modifying the image into a vector the pixel values of the image may be flattened to be used as a vector whereby the intensity of each pixel becomes an element in the vector. The histograms of pixel intensity values may then be computed for different color channels (e.g., red, green, blue) or color spaces.

Processor machine learning system 134 may utilize any number of deep learning models which can be trained to automatically extract hierarchical features from images and convert them into embedding vectors that can be used for the search algorithm. This deep learning system could be an encoder-only or an encoder-decoder neural network. The input to the encoder may be any number of images in different formats. The encoder may include Convolutional Neural Network (CNN) or a Transformer architecture for processing images, capturing spatial hierarchies, and extracting features. The layers of the CNN (convolutional layers, pooling layers) or Transformer (attention layers, fully-connected layers) may progressively reduce the spatial dimensions of the image while increasing the depth of the feature maps. The output of the encoder may be a compact representation of the input image in the form of a context vector which encodes its significant features. Optionally, there could be a decoder that transforms the encoded information into a new format, e.g. The decoder may be a transformer that generates a textual description of the image in a standardized format such that it may be compared to other consumer items.

The machine learning model may be based on the CLIP (Contrastive Language-Image Pretraining) architecture and loss function that learns a joint embedding space for language and image. This enables searching across both domains in the same search index, e.g., using text inputs (e.g., natural language search queries) to retrieve from a search index of images or using image inputs to retrieve from a search index of text. Moreover, the machine learning model may be a foundation model that is pre-trained on millions or even billions of data points. In the case of CLIP, it would be a large dataset of both images and captions. In addition, the machine learning model can be fine-tuned specifically for the fashion domain by collecting a dataset of fashion images and corresponding descriptions that enables the model to have a better representation of fashion concepts like brand, material or category. The captions for the images could be synthetically generated from the partner data. The fine-tuning may use the CLIP loss function or any other loss function that is compatible with the choice of machine learning model architecture. Users 101 may initially register to become a registered member associated with recommendation system 100 or may operate on recommendation system 100 without login credentials. Recommendation system 100 may be downloadable and installable on user devices 102 through an API extension or application. In one example embodiment of user session by a user 101, application server 114 receives a search request from a user device 102. This may be performed automatically by selecting a selectable user interface element that is presented on a firsthand consumer goods website having one or more specific firsthand consumer items. In some embodiments the selectable user interface element may appear after the user performs a specific movement such as moving the cursor upward to open another tab selectable icon or the search window. In some embodiments the selectable user interface element may only appear after a predesignated amount of time or if the user has already viewed that specific firsthand consumer goods item. such that it is only visible when the user is interested in firsthand consumer items. In further embodiments, recommendation system 100 may be integrated into the firsthand website as a sidebar presented on a left, bottom, or right side of the screen.

The search request may include a subject image of a subject consumer item that user 101 wishes to identify resale consumer goods available for sale. User 101 may capture a subject image of a subject consumer item that they are interested in. For example, user 101 sees an individual wearing a consumer item or a consumer item is for sale at a store they are interested in purchasing and captures a subject image thereof. The subject image may be captured using a camera integral to user device 102 and/or may be captured using a separate computing device (e.g., a digital camera) and later downloaded to user device 102.

Additionally, or alternatively, user 101 may have an existing subject image of a consumer item (e.g., an image found online on a website or a social media platform) that they wish to find potential matches for. Recommendation application 110 may automatically analyze any consumer images that are currently displayed on a website or social media platform or uploaded by the user to transmit the subject image to the application server 114 with a search request.

Application server 114 receives a search request from user device 102. The search request may include a subject image of a subject consumer item that user 101 wishes to receive resale alternatives. The search request may additionally or alternatively include one or more search filters to narrow the field of the search implemented by user device 102. Application server 114 may store the subject image and/or the search request in a file location in database 116 associated with user 101. Application server 114 then may perform image recognition or analysis on the subject image using object character recognition as well as sorting, standardization, and translation into vectors previously discussed for the resale consumer items on the resale seller websites.

When viewing a consumer item on a first-hand consumer goods website, application server 114 is designed to scrape all the relevant product information from the website including product images title, description, size, color, category, price. Hard-coded scraping solutions are typically too expensive to maintain since they require a custom integration for each website. To overcome this problem, recommendation system 100 implements two heuristics that extract information based on different common metadata standards in the header then combine the extracted metadata from multiple sources into one single source.

In conjunction with the heuristics, recommendation system 100 may utilize modern language models (LLMs) like Llama-7B to extract structured JSON data from the unstructured website content by instruction-based prompting (language model prompts), few-shot prompting (provide the model with a well-chosen set of examples), and fine-tuned model (whereby the model is trained on a small dataset of example websites and JSON outputs).

Additional optimization may also be used to streamline the scraping process when such as whenever a request is made to the language model to extract the structured data from the firsthand website, application server 114 may match it against the document object model (DOM), the programming interface for web documents where each node of the DOM corresponds to a part of the web page, such as elements, attributes, and text. Application server 114 then finds the selectors (e.g., x-path) of the HTML tags containing the structured metadata. These identifiers may be stored in databases 116 and, thereby, provide a cache that will be able to extract the metadata automatically for all websites that have already been visited much cheaper and faster. Application server 114 may then check and determine whether the firsthand website has updated its structure (which happens quite frequently due to design updates, sales, new collections, and different locales) or user 101 visits a new website and the cached selectors don't match the DOM, LLM-based extraction logic (previously described) may then once again be applied.

In some situations, the product images on first-hand websites may include more than just the product, e.g., a model that wears an entire outfit around the product or a background image. These can be distracting to the image model and therefore create a lot of false-positive matches. Thus, recommendation system 100 may provide a method to automatically crop all images based on the contextual data the website provides.

In doing this application server 114 may utilize the previously collected and extracted metadata (title, description, URL) and the LLM-based classification mechanism, to generate a product category. This is an advantage that the present invention has for collecting the entire website context over pure image-based approaches such as Google Lens. Using this extracted product category, application server 114 may use a foundation model (e.g., Segment Anything Model or Grounding DINO) based on the previous training to automatically generate a bounding box around the correct fashion piece from the image and the category label as well as the user 101 input of what they are looking for.

Then, application server 114 may crop the image to just this subsection of the image. In addition, this mechanism is run on a very efficient serverless architecture to reduce the search latency. In further embodiments, recommendation system 100 may allow user 101 to position a lasso or box around the desired consumer item whereby the box will be used as a cropping mechanism to determine the appropriate consumer that user 101 wishes to have resale consumer item recommendations for. When multiple images are present on the firsthand website, recommendation system 100 may determine which image represents the product best, using size & website heuristics (such as the bigger picture among smaller thumbnails). Similarly, user 101 may lasso or crop which image they wish to see resale results for using a point and drag or boxing method.

Application server 114 may then retrieves the closest vector from the search index for both the image and text vectors whereby recommendation system 100 utilizes a hierarchical navigable small world algorithm as a data model and search algorithm to approximate nearest neighbor search in high-dimensional spaces based on the image received and analyzed on the firsthand seller website. The system then applies a set of filters based on our extracted metadata (category, size, price, brand). This search may be performed in parallel using multiple product images, text vectors, and multiple filter sets to retrieve multiple result sets which are fused in the next step. Application server 114 may perform foundation model-based classification and intelligent color detection which may automatically find the closest color word (rouge to burgundy) describing a fashion piece using a combination of segmentation foundation models, clustering algorithm, and color space mapping.

Once the approximate nearest neighbors are determined to the consumer item on the firsthand consumer seller website, application server 114 may generate a list of potential resale recommendations of the firsthand consumer item. In one embodiment, resale consumer items that match the firsthand consumer item with a confidence score higher than a predetermined threshold are automatically added to the list of potential matches or all matches and nearest neighbors may be displayed as a list, on a grid, on a drop down menu. Each potential match may include an image of the resale consumer item and a link to the resale seller webpage at which user 101 may purchase the consumer item picture. In further embodiments, only resale consumer items that are priced below the firsthand consumer item may be generated and viewed whereby some websites may be restricted (ones that charge more or have a lower amount reviews) while when an item is sold out or has dropped below a predetermined threshold of stock on the firsthand consumer page or resale sites all pricing options may be viewed including the websites that were restricted may be presented.

Application server 114 may store the list of potential matches and/or a log of the search request and/or search results at databases 116 in a file location associated with user 101. Application server 114 returns the list of potential matches to user device 102. User device 102 executes consumer goods application 118 to display the list of potential matches to user 101.

The list may include differentiators if the match is a second hand good, used good, deadstock, or overstock item whereby these matches may be filtered to these categories to narrow the results. Depending on the user's previous purchases the specific category may be prioritized.

User device 102 transmits to application server 114 any identification of a suitable match from user 101 from user input on user interface 103. In one embodiment, if any identification of a suitable match is received, the search is indicated as successful (e.g., by indexing the stored log of the search in database 116 with a "successful" tag). If no such identification is received, the search is indicated as unsuccessful. Application server 114 is configured to re-run unsuccessful searches periodically.

User 101 may be presented with the identification command corresponding to any potential match to identify that potential match as a suitable match. In some embodiments, upon such a selection, recommendation application 110 may prompt user 101 to specify whether the suitable match is an exact match or whether user 101 has selected a different potential match as a suitable match because, for example, no exact match was found, or user 101 preferred that consumer item over the exact match.

Application server 114 may store a log of all suitable matches identified by selection of an identification command in, for example, databases 116 whereby user 101 may access and be presented previous searches and results from a tabbed section. Application server 114 may use the log of suitable matches to further train the algorithm. In some embodiments, each link may be configured as an identification command. More specifically, selection by user 101 of a link may be considered identification of the corresponding potential match as a suitable match, by application server. A score (track purchases at second-hand partners may be created by clicks from user 101 whereby they may be awarded points redeemable for consumer goods and discounts.

Recommendation system 100 not only provides resale consumer goods results to the user but also builds upon the definition of a favorable search outcome. Factors such as matching color, brand, category, price range, material, and affordability play crucial roles. However, there are situations where these factors may conflict, such as when there is no perfect match—e.g., the same brand with a different color versus a different brand with the same color. Additionally, complexities arise due to the interplay between these factors; for example, preferring a different brand with the same color may depend on whether both brands fall within a similar price range. User preference is another essential aspect to consider. Different users may have varying preferences, where the importance of factors like brand can vary based on individual personality and circumstances, such as whether they are shopping for themselves or others.

Traditional methods require the integration of diverse ranking factors, either through the use of a rank-fusion algorithm (e.g., reciprocal rank fusion) or the training of a multi-factor scoring model (e.g., logistic regression). The objective is to combine multiple ranking criteria into a unified ranking score based on a dataset of ranked preferences. However, these methods fall short in addressing the intricate interactions among these factors comprehensively. Furthermore, they struggle to adapt to varying user preferences. An effective approach to cater to a wide range of user preferences involves employing not just a single scoring mechanism but a mixture of different results based on the specific context. For instance, this may entail presenting one result with a different brand but the same color and another result with the same brand but a different color. The suitability of such an approach heavily depends on the unique context at hand, which can encompass a multitude of product categories, each presenting distinct scenarios.

Recommendation system 100 may have an LLM-based preference-aware reranking which uses a language model to curate the final result set based on multiple lists of pre-ranked results. Here three strategies may be implemented. 1. Instructing the language model to make context-aware decisions and verbally express a complex user utility function (e.g., what are the different trade-offs, what is important/what is less important, how to ideally curate a varied and relevant set of results). 2. Succinctly express relevant information to the language model (e.g., image similarity scores of given result sets, what are the ranking factors behind different result sets). 3. Allowing the user to verbally express their own preferences and incorporate that into the overall re-ranking prompt. Using this method, the user may write a brief sentence, e.g. "Today, I really care that my clothing has the same material but I don't really care about color, also it should only show premium brands from roughly the same price range". These allow for much more fine-grained communication about the user's preferences in a way that classical filters don't allow.

In this illustrated embodiment, user 101 may interact to narrow the field of search (to be conducted by application server 114) and/or to narrow the list of potential matches (to be generated by application server 114) before it is presented to user 101. User 101 may be presented with a text window interface whereby user 101 may enter their desires for resale consumer goods. Once the updated rankings are determined application server 114 may generate a list of potential resale recommendations of the firsthand consumer item. Each new potential recommendation may include an image of the resale consumer item and a link to the resale seller webpage at which user 101 may purchase the consumer item picture.

Recommendation system 100 may have a centralized dashboard having product analytics, DAU, MAU, churn, track various actions (signups, opens, searches), viral analytic, referral conversion, K score, # referrals, and post-purchase analytics, average order cost, average order payout, number of repeat purchasers.

Figure 7:
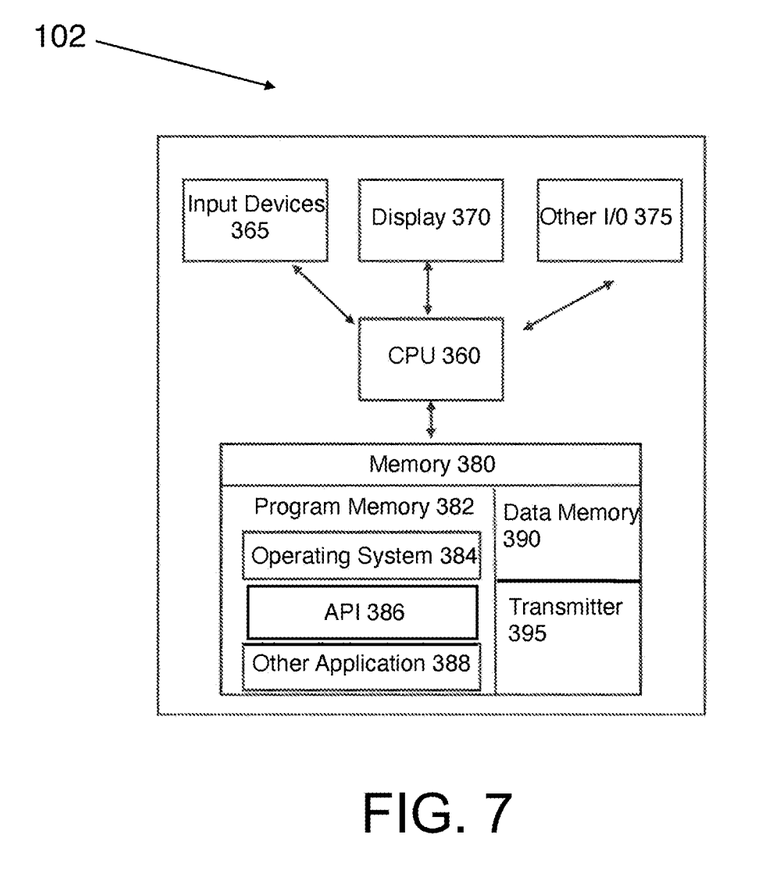
FIG. 7 shows a block diagram for the user computing device.

One or more embodiments of user devices 102 are further detailed in FIG. 7. User devices 102 may include hardware components that allow access to edit and query recommendation system 100. User devices 102 may include one or more input devices such as input devices 365 that provide input to a CPU (processor) such as CPU 360 notifying it of actions. The actions may be mediated by a hardware controller that interprets the signals received from input devices 365 and communicates the information to CPU 360 using a communication protocol. Input devices 365 may include but are not limited to a mouse, a keyboard, a touchscreen, an infrared sensor, a touchpad, a wearable input device, a camera- or image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU 360 may communicate with a hardware controller for devices, such as for a display 370. Display 370 may be used to display text and graphics. In some examples, display 370 provides graphical and textual visual feedback to a user.

In one or more implementations, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU 360 may have access to a memory such as memory 380. Memory 380 may include one or more of various hardware devices for volatile and non-volatile storage and may include both read-only and writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory.

Memory 380 may include program memory such as program memory 382 capable of storing programs and software, such as an operating system such as operating system 384, API such as API 386, and other computerized programs or application programs such as application programs 388. Memory 380 may also include data memory such as data memory 390 that may include database query results, configuration data, settings, user options or preferences, etc., which may be provided to program memory 382 or any element of user devices 102.

User devices 102 may in some embodiments be mobile computing devices such as an iPhone, Android-based phone, or Windows-based phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processor power and memory capacity to perform operations of ser devices 102 while in communication with a network. User devices 102 may have location tracking capabilities such as Mobile Location Determination System (MLDS) or Global Positioning System (GPS) whereby they may include one or more satellite radios capable of determining the geographical location of a computing device.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A recommendation system for resale consumer items including a processor in communication with a memory, wherein the processor is programmed to:
   store a plurality of seller images indexed in a database according to a set of characteristics associated with the plurality of seller images, wherein the plurality of seller images are associated with the resale consumer items on resale consumer goods websites, wherein the resale consumer items comprise secondhand goods and/or used items, and wherein the resale consumer goods websites provide the secondhand goods and/or the used items;
   receive a search request from a user computing device instructing to conduct a search for a resale consumer item that is a closest potential match to a specific consumer item pictured in a subject image on a consumer goods website, the search request including the subject image further comprising:
      receive user input on a text interface of a user interface on the user computing device indicating one or more preferences and parameters of the user for the resale consumer items;
   analyze the subject image to determine one or more characteristics associated with the subject image further comprising;
      scrape product information from the consumer goods website by implementing two heuristics that extract metadata based on different common metadata standards in a header of the consumer goods website;
      combine the extracted metadata from multiple sources into a single source; and
      utilize language models to extract structured JSON data from unstructured website content of the consumer goods website;
   automatically generate multiple lists of potential recommendations, wherein each list of the multiple lists comprises an initial ranking;
   generate a final list of potential recommendations with a re-ranking, wherein the reranking uses a language model to curate a final result set based on the multiple lists of potential recommendations, wherein the processor is further configured to:

instruct the language model to make context-aware decisions and verbally express a complex user utility function and to parse the user input obtained from the text interface;

express image similarity scores of given result sets to the language model; and analyze and incorporate the user input into the re-ranking when generating the final list of potential recommendations prior to transmitting the final list of potential recommendations with the re-ranking in order to incorporate the one or more preferences and parameters of the user in the final list; and after the generating of the final list of potential recommendations with a re-ranking, transmit the final list of potential recommendations with the re-ranking to the user computing device for display to a user associated with the user computing device, wherein each potential recommendation on the final list of potential recommendations includes a seller image of the plurality of seller images and a link to a resale web page that includes a resale consumer item of the resale consumer items, wherein the link to the resale web page directs the user to a resale consumer goods website that is separate from the consumer goods website.

2. The recommendation system of claim 1, wherein the processor is further programmed to:

determine there are multiple consumer items in the subject image on the consumer goods website;

automatically generate a bounding box around the specific consumer item;

use extracted metadata and an LLM-based classification mechanism to generate a product category wherein with the product category a foundation model automatically generates the bounding box around the specific consumer item; and crop the subject image to a subsection of the subject image.

3. The recommendation system of claim 1, wherein the processor is further programmed to:

determine there are multiple images on the consumer goods website;

automatically generate a bounding box around the subject image having the specific consumer item; and use extracted metadata and an LLM-based classification mechanism to generate a product category wherein with the product category a foundation model automatically generates the bounding box around the subject image from an image and category label.

4. The recommendation system of claim 1, wherein the processor is further programmed to:

utilize instruction-based prompting;

utilize few-shot prompting; and train a model on a dataset of example websites and JSON outputs.

5. The recommendation system of claim 1, wherein the processor is further programmed to:

when there is a request extract metadata from the consumer goods website, match the metadata against a document object model of the consumer goods website and find selectors of HTML tags having the metadata;

store identifiers in the database to provide a cache to extract the metadata automatically for websites that have already been visited;

utilize the cache;

determine that the user has visited a new website and cache selectors do not match the document object model; and utilize LLM-based extraction logic instead of the cache.

6. The recommendation system of claim 1, wherein the processor is further programmed to:

use a vector database and an HNSW algorithm for computing approximate nearest neighbor to the specific consumer item;

apply a set of filters based on extracted metadata including category, size, price, brand; and perform a search in parallel using multiple product images, text vectors, and filter sets to retrieve multiple result sets.

7. The recommendation system of claim 1, wherein the processor is further programmed to:

download and embed the plurality of seller images on the resale consumer good websites into vectors; and insert them into a vector database.

8. The recommendation system of claim 1, wherein the processor is further programmed to:

maintain a data warehouse that keeps track of inventory changes on the resale consumer goods websites including which of the resale consumer items are new and have to be added to a search index, which of the resale consumer items have updated metadata and have to be edited in the search index, which of the resale consumer items are sold out and should be removed from the search index.

9. A computer-implemented method for recommending resale consumer goods alternatives, comprising:

providing a recommendation algorithm to search and locate a resale consumer item from among one or more resale consumer item websites after receiving a request to search for a specific consumer item found on a consumer item website based on a subject image of the specific consumer item, wherein the resale consumer item is a secondhand good or a used item, and wherein the one or more resale consumer item websites provide the secondhand good or used item, wherein the subject image of the specific consumer item is taken from the consumer item website and provided to the recommendation algorithm to conduct a search to find and locate a resale consumer item that is a nearest match to the specific consumer item;

using the recommendation algorithm, analyzing the subject image to determine one or more characteristics associated with the subject image further comprising:

extracting relevant product metadata and data from the subject image using metadata heuristics, large language model (LLM) based extraction, manual selector-database, and LLM-generated selector-database further comprising:

scraping product information from the consumer goods website by implementing two heuristics that extract the relevant metadata and data based on different common metadata standards in a header of the consumer goods website;

combining the extracted metadata from multiple sources into a single source; and utilizing language models to extract structured JSON data from unstructured website content of the consumer goods website;

running the search in parallel using multiple product images, text vectors, and multiple filter sets to retrieve multiple result sets from the one or more resale consumer goods websites;

fusing and re-ranking the multiple result sets and obtaining multiple sets of scored results;

merging the multiple sets of scored results into a final result list of potential recommendations; and transmitting the final result list of potential recommendations with the re-ranking to the user, wherein the final list of potential recommendations directs the user to a resale consumer item website that is separate from the consumer item website that was the source for the subject image.

10. The computer-implemented method of claim 9, wherein determining that the user has interacted with the subject image comprises:

requesting extract metadata from the consumer item website;

matching metadata against a document object model of the consumer item website and find identifiers of HTML tags having the metadata;

storing the identifiers in a database to provide a cache that will be able to extract the metadata automatically for websites that have already been visited;

utilizing the cache;

determining that the user has visited a new consumer item website and cache tags do not match the document object model; and utilizing LLM-based extraction logic instead of the cache.

11. The computer-implemented method of claim 9, wherein determining that the user has interacted with the subject image comprises:

intelligent image cropping by cropping a product image of the resale consumer item onto a correct item using two foundation models.

12. The computer-implemented method of claim 11, wherein determining that the user has interacted with the subject image further comprises:

performing foundation model-based classification and intelligent color detection which automatically finds a word describing a consumer piece using a combination of segmentation foundation models, clustering algorithm, and color space mapping.

13. The computer-implemented method of claim 11, wherein determining that the user has interacted with the subject image further comprises:

generating vector embeddings using a Contrastive Language-Image Pre-training model for images and a sentence transformer for text that has been fine tuned for consumer items.

14. The computer-implemented method of claim 12, wherein determining that the user has interacted with the subject image further comprises:

retrieving a closest vector from a search index for both image and text vectors by using Hierarchical Navigable Small Worlds algorithm or encoder-decoder neural network algorithm for computing approximate nearest neighbors.

15. The computer-implemented method of claim 9, wherein determining that the user has interacted with the subject image comprises:

providing a data pipeline initially for the resale consumer item, by parsing and loading resale inventory data from a variety of sources and data formats; and parsing the resale inventory data and brings the resale inventory data into a common schema.

16. The computer-implemented method of claim 9, wherein determining that the user has interacted with the subject image further comprises:

maintaining a data warehouse that keeps track of inventory changes on the one or more resale consumer item websites including which of the resale consumer items are new and have to be added to a search index, which of the resale consumer items have updated metadata and have to be edited in the search index, which of the resale consumer items are sold out and should be removed from the search index, wherein when the resale consumer items are sold out, a second list of potential recommendations is displayed with more results than the first list of potential recommendations.

17. The computer-implemented method of claim 9, further comprising:

receiving user input on a text box indicating one or more preference and/or a parameter of the user for the resale consumer item; and analyzing the user input and incorporating the user input into the re-ranking when generating the final list of potential recommendations.

* * * * *